United States Patent
Hebert, Jr. et al.

(10) Patent No.: US 10,174,950 B2
(45) Date of Patent: Jan. 8, 2019

(54) PORTABLE STOVE WITH ACCESSORY PORT

(71) Applicants: Michael E. Hebert, Jr., Milford, NH (US); Adam E. Wilcox, Candia, NH (US); Jeffrey M. Megivern, Manchester, NH (US)

(72) Inventors: Michael E. Hebert, Jr., Milford, NH (US); Adam E. Wilcox, Candia, NH (US); Jeffrey M. Megivern, Manchester, NH (US)

(73) Assignee: Johnson Outdoors Inc., Racine, WI (US)

( * ) Notice: Subject to any disclaimer, the term of this patent is extended or adjusted under 35 U.S.C. 154(b) by 602 days.

(21) Appl. No.: 14/730,790

(22) Filed: Jun. 4, 2015

(65) Prior Publication Data

US 2016/0356502 A1     Dec. 8, 2016

(51) Int. Cl.
  *F24C 1/16*     (2006.01)
  *F24C 3/14*     (2006.01)
  *B23P 19/04*    (2006.01)

(52) U.S. Cl.
  CPC ............... *F24C 1/16* (2013.01); *B23P 19/04* (2013.01); *F24C 3/14* (2013.01)

(58) Field of Classification Search
  CPC ............. F24C 3/14; F24C 1/16; B23P 19/04
  USPC ........................................................ 126/38
  See application file for complete search history.

(56) References Cited

U.S. PATENT DOCUMENTS

| | | |
|---|---|---|
| 101,621 A | 4/1870 | Hulbert, Jr. |
| 189,787 A | 4/1877 | Rothschild, Jr. |
| D33,885 S | 1/1901 | Richmond |
| 1,201,138 A | 10/1916 | Bingham |
| 2,073,813 A | 3/1937 | Slezak |
| 2,278,734 A * | 4/1942 | Perry ................ F24C 5/20 126/213 |
| D143,360 S | 8/1945 | Stempel et al. |
| D184,450 S | 2/1959 | Morton |
| 3,140,740 A | 7/1964 | Lagreid et al. |
| D216,233 S | 12/1969 | Gruver, Jr. et al. |
| D227,850 S | 7/1973 | Benson |
| D229,448 S | 11/1973 | Traclet |
| 3,783,856 A | 1/1974 | Amos |
| 3,789,821 A | 2/1974 | Fick et al. |
| 3,804,076 A | 4/1974 | Fant et al. |
| 3,812,839 A * | 5/1974 | Helgeson ............ F24C 3/14 126/38 |
| D245,220 S | 8/1977 | Chan |

(Continued)

FOREIGN PATENT DOCUMENTS

| | | |
|---|---|---|
| CA | 2613858 A1 | 5/2009 |
| GB | 2 404 434 A | 2/2006 |
| KR | 200 459 573 Y1 | 3/2012 |

OTHER PUBLICATIONS

U.S. Appl. No. 29/529,226, Hebert et al., filed Jun. 4, 2015.
U.S. Appl. No. 29/529,237, Hebert et al., filed Jun. 4, 2015.

*Primary Examiner* — Alfred Basichas
(74) *Attorney, Agent, or Firm* — Reinhart Boerner Van Deuren P.C.

(57) ABSTRACT

A portable stove is provided. The portable stove includes an accessory port such that it may be connected to an accessory component. With such a connection, a single fuel source which provides a regulated flow of fuel may be utilized for both the portable stove and the accessory component.

20 Claims, 7 Drawing Sheets

(56) References Cited

U.S. PATENT DOCUMENTS

| | | |
|---|---|---|
| D247,993 S | 5/1978 | Calzone, III |
| D251,893 S | 5/1979 | Chan |
| D251,894 S | 5/1979 | Chan |
| 4,643,164 A | 2/1987 | LaForge |
| D295,818 S | 5/1988 | Chan |
| 4,954,075 A | 9/1990 | Francino |
| D376,724 S | 12/1996 | Mendelson et al. |
| D387,240 S | 12/1997 | Simmonds et al. |
| 5,860,410 A | 1/1999 | Hollingsworth, Jr. |
| D406,722 S | 3/1999 | Benton et al. |
| 6,038,965 A | 3/2000 | Thorndyke |
| 6,202,640 B1 | 3/2001 | Naperola et al. |
| D439,801 S | 4/2001 | Measom |
| D449,204 S | 10/2001 | Groll |
| D469,298 S | 1/2003 | Hinton et al. |
| D499,883 S | 12/2004 | Perella et al. |
| D522,306 S | 6/2006 | Wilgus et al. |
| 7,207,346 B2 * | 4/2007 | Park .................. F23N 5/247 137/543 |
| D570,639 S | 6/2008 | Nardone |
| D576,444 S | 9/2008 | Chung |
| D586,612 S | 2/2009 | Rae |
| D592,005 S | 5/2009 | Richardson et al. |
| D600,971 S | 9/2009 | Garpelin |
| D618,038 S | 6/2010 | Davies et al. |
| D618,506 S | 6/2010 | Offredi |
| 7,806,138 B1 | 10/2010 | Frantz |
| D642,373 S | 8/2011 | Decarlo et al. |
| D669,730 S | 10/2012 | Mandil |
| D677,124 S | 3/2013 | Montgomery |
| D677,516 S | 3/2013 | Cloutier |
| D680,799 S | 4/2013 | Chung |
| 8,596,863 B2 | 12/2013 | Lascanec et al. |
| D698,197 S | 1/2014 | Andersson |
| D701,721 S | 4/2014 | Jan |
| D755,002 S | 5/2016 | Garman |
| 2005/0268902 A1 | 12/2005 | Mosher, II et al. |
| 2006/0185660 A1 | 8/2006 | Sords |
| 2006/0196491 A1 * | 9/2006 | Proffitt ............... A47J 37/0713 126/9 R |
| 2007/0034198 A1 | 2/2007 | Arad |
| 2007/0087297 A1 | 4/2007 | Long |
| 2007/0095337 A1 * | 5/2007 | Mosher, II .............. F24C 3/14 126/25 R |
| 2007/0108197 A1 | 5/2007 | Richardson et al. |
| 2008/0029082 A1 | 2/2008 | Dowst et al. |
| 2009/0280447 A1 | 11/2009 | Long |
| 2010/0206884 A1 | 8/2010 | Tunstall |
| 2010/0275897 A1 | 11/2010 | May |
| 2011/0253030 A1 | 10/2011 | Lecanec et al. |
| 2012/0125317 A1 | 5/2012 | Caprathe |
| 2014/0209083 A1 | 7/2014 | Young |
| 2014/0290640 A1 | 10/2014 | Kim |
| 2014/0338652 A1 | 11/2014 | Hagström et al. |

* cited by examiner

PORTABLE STOVE WITH ACCESSORY PORT

FIELD OF THE INVENTION

This invention generally relates to recreational equipment, and more particularly to portable stoves.

BACKGROUND OF THE INVENTION

Portable stoves are typically employed for food/water preparation in recreational settings e.g. at a camp site, or during a break when hiking. Such stoves include one or more burners and elements for supporting cookware in proximity to the burners. Such stoves typically operate by burning a fuel source such as propane. This fuel source is ordinarily contained in a separate canister or vessel. A user connects the stove to the fuel source using a line with an integrated pressure regulator.

While such devices have proven very useful, they are not without need for improvement. Currently, these portable stoves are generally small in size and typically utilize one or two burners. For larger meals or applications, however, having only two burners may be inefficient or undesirable. As such, it is not uncommon to bring multiple portable stoves to allow for simultaneous operation of a plurality of burners.

Unfortunately, packing multiple stoves also means packing multiple fuel sources as there is a one to one relationship of these components. Further, there are in many cases other devices such as lanterns or the like which also operate on the same type of fuel source. As such, the number of fuel source canisters required may be undesirably too much when bringing multiple stoves and other accessories camping and/or hiking. As such, there is a need in the art for an improved cooking device that overcomes the above.

The invention provides such a cooking device. These and other advantages of the invention, as well as additional inventive features, will be apparent from the description of the invention provided herein.

BRIEF SUMMARY OF THE INVENTION

In one aspect, a portable stove is provided. An embodiment of such a portable stove includes an outer housing and at least one burner contained within the outer housing. An input port for connection to a fuel source is provided such that the input port receives a regulated flow of fuel from the fuel source. The input port is operably connected to the at least one burner to provide the regulated flow of fuel to the burner. An output port is operably connected to the input port downstream from the input port such that the regulated flow of fuel is available at the outlet port.

A control valve may be connected between the input port and the burner. The control valve is operable to control the flow rate of the regulated flow to the burner. The control valve may be interposed between the input port and the output port relative to the regulated flow. In certain embodiments, the control valve is configured to allow a portion of the regulated flow to pass through the at least one control valve substantially unaffected by manipulation of the control valve.

In certain embodiments, the at least one burner includes two burners. Each of these two burners has a control valve connected thereto. Each of the control valves are interposed between the input port and the output port. Each of the two control valves is configured to allow a portion of the regulated flow to pass therethrough substantially unaffected by manipulation of either of the two control valves.

In certain embodiments, the control valve may be connected downstream of both the input port and the output port relative to the regulated flow. The at least one burner may include two burners each having a control valve connected thereto. The control valves are connected downstream of both the input port and the output port.

In certain embodiments, the housing has a rectangular profile. Each of the input port and output port are accessible on a sidewall of the outer housing. The input and output ports may be adjacent one another on the sidewall of the outer housing and face in a same direction.

In certain embodiments, the outer housing has a generally circular periphery. The input and output ports are disposed within the circular periphery within pockets of the outer housing. The input port and output port in such a configuration face in opposite directions.

In another aspect, a portable stove is provided. An embodiment of such a portable stove according to this aspect includes an outer housing and at least one burner contained within the outer housing. An input port is provided for connection to a fuel source such that the input port receives a regulated flow of fuel from the fuel source. An output port is also provided for providing the regulated flow to an accessory component. The portable stove also includes a control valve for controlling a flow rate of the regulated flow to the at least one burner. The input port, output port, and control valve are serially connected to one another.

In certain embodiments, the control valve is interposed between the input port and the output port relative to the regulated flow. The control valve is configured to allow a portion of the regulated flow to pass through the control valve substantially unaffected by manipulation of the control valve. The at least one burner may include two burners. Each burner has a respective control valve connected thereto. The control valves are interposed between the input port and the output port. Each of the control valves is configured to allow a portion of the regulated flow to pass therethrough substantially unaffected by manipulation of either of the two valves.

In certain embodiments, the control valve is connected downstream of both the input port and the output port relative to the regulated flow. The at least one burner includes two burners. Each has a control valve connected thereto. The control valves are connected downstream of both the input port and the output port.

In yet another aspect, a method of making a portable stove is provided. The method includes providing an outer housing, and situating at least one burner within the housing. The method also includes connecting an input port to the at least one burner. The input port is configured to receive a regulated flow of fuel from a fuel source. The method also includes connecting a control valve to the at least one burner and to the input port. The control valve is configured to control a flow rate of the regulated flow to the burner. The method also includes connecting an output port to the input port such that the regulated flow is available at the output port.

In certain embodiments, the step of connecting the output port to the input port includes connecting the output port such that the control valve is interposed between the input port and the output port relative to the regulated flow. In other embodiments, the step of connecting the output port to the input port includes connecting the output port such that the control valve is downstream from both the input port and the output port relative to the regulated flow.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, embodiments of a portable stove with accessory port are described herein. As will be understood in greater detail from the below, embodiments of the invention advantageously incorporate an accessory port which allows for a regulated flow gas output from a single portable stove. Other stoves, accessories, or other devices may be connected to this accessory port such that a single fuel source may provide a regulated flow of fuel to each of the aforementioned.

Figure 1:
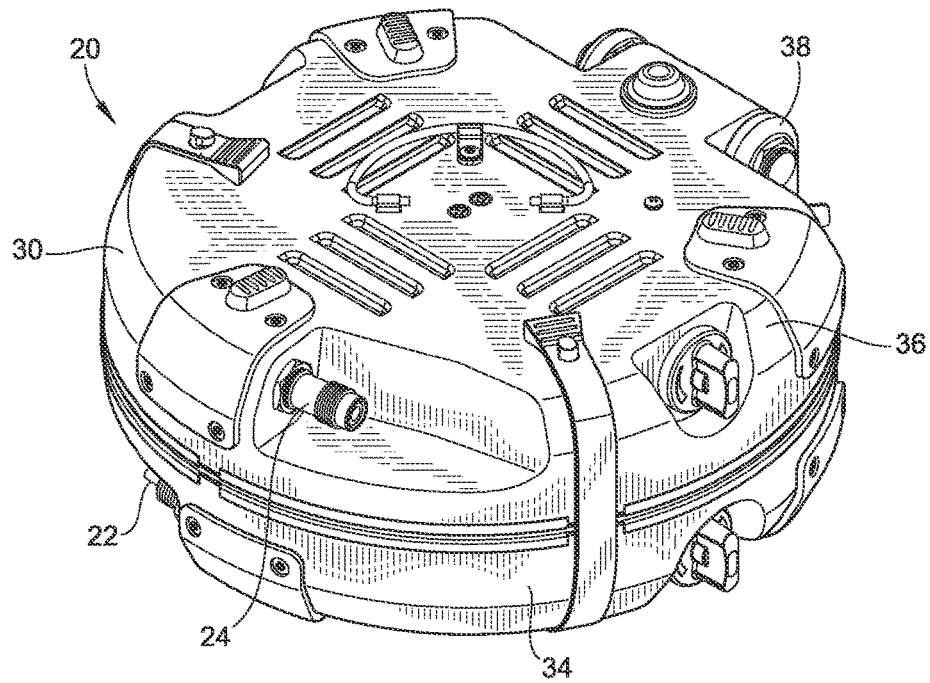
FIG. 1 is a perspective view of one embodiment of a portable stove according to the teachings herein.

Turning first to FIG. 1, an embodiment of a stove 20 is illustrated therein. Stove 20 includes a generally compact design and thus exhibits a high degree of portability. Stove 20 incorporates a gas input port 22 for connection to a fuel source, and a gas output port 24 for providing a regulated flow of fuel from the fuel source to a secondary stove or other accessory.

Stove 20 includes an outer housing 30 formed by first and second burner assemblies 34, 36. A hinge arrangement 38 connects first and second burner assemblies 34, 36 such that the same are movable relative to one another from a closed position as illustrated in FIG. 1, to an open position as illustrated in FIG. 2.

Figure 2:
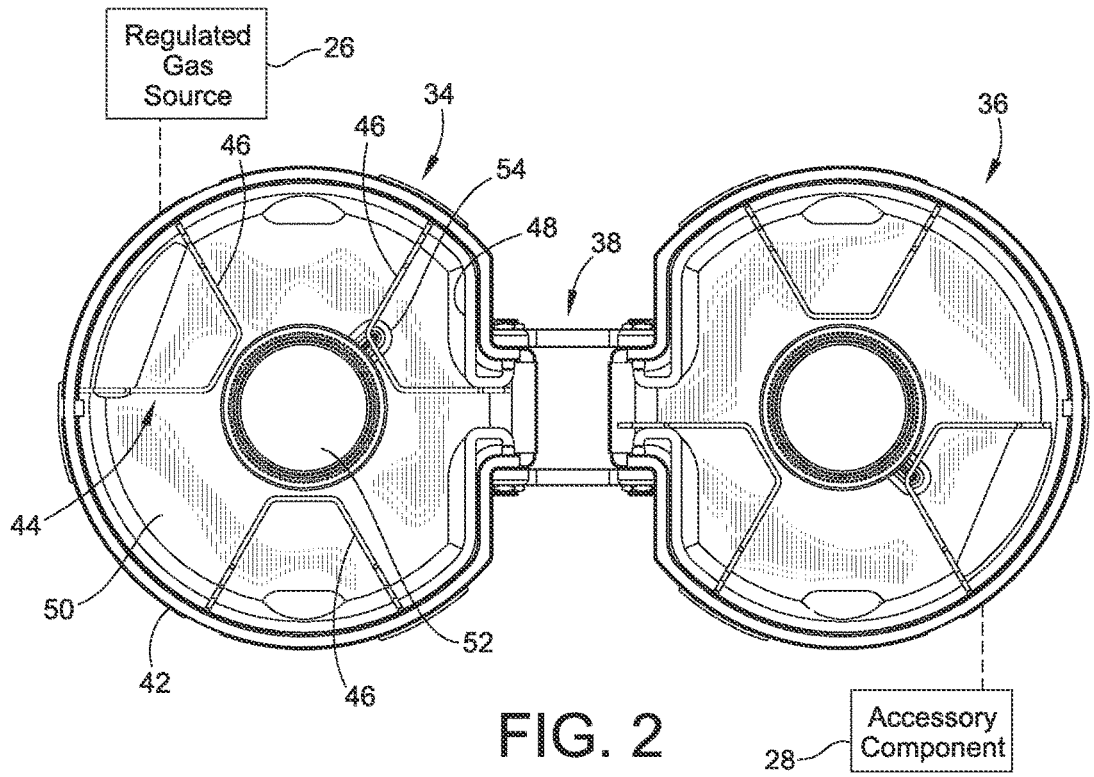
FIG. 2 is a top view of the embodiment of FIG. 1.

Turning now to FIG. 2, stove 20 is shown in the open position. As can be seen therein, a regulated gas source 26 is connected to gas input port 22. As will be understood by those of skill in the art, a regulated gas source is a fuel source with an in-line regulator. As such a configuration may take many different forms, regulated gas source 26 is shown schematically. An accessory component 28 is connected to gas output port 24. The term "accessory port" is used generically herein and may be any device capable of utilizing a regulated flow of gas for providing a function. As non-limiting examples, accessory component 28 may be a similar or dissimilar stove, lantern, or other accessory.

With reference to first burner assembly 34, the same includes an outer shell 42 which carries a grate assembly 44. Grate assembly 44 includes a plurality of grate elements 46 supported by a support bar 48. A drip tray 50 is positioned below grate assembly 44 as shown. A portion of a burner 52 projects above drip tray 50 and is positioned below grate assembly 44. An ignitor 54 is positioned in proximity to burner 52. Additionally, a switch 56 (See FIG. 3) is accessible from outer shell 42 for triggering igniter 54. For purposes of brevity, second assembly 36 is not described in any greater detail as it will be recognized that the same is identical to first burner assembly 34.

Figure 3:
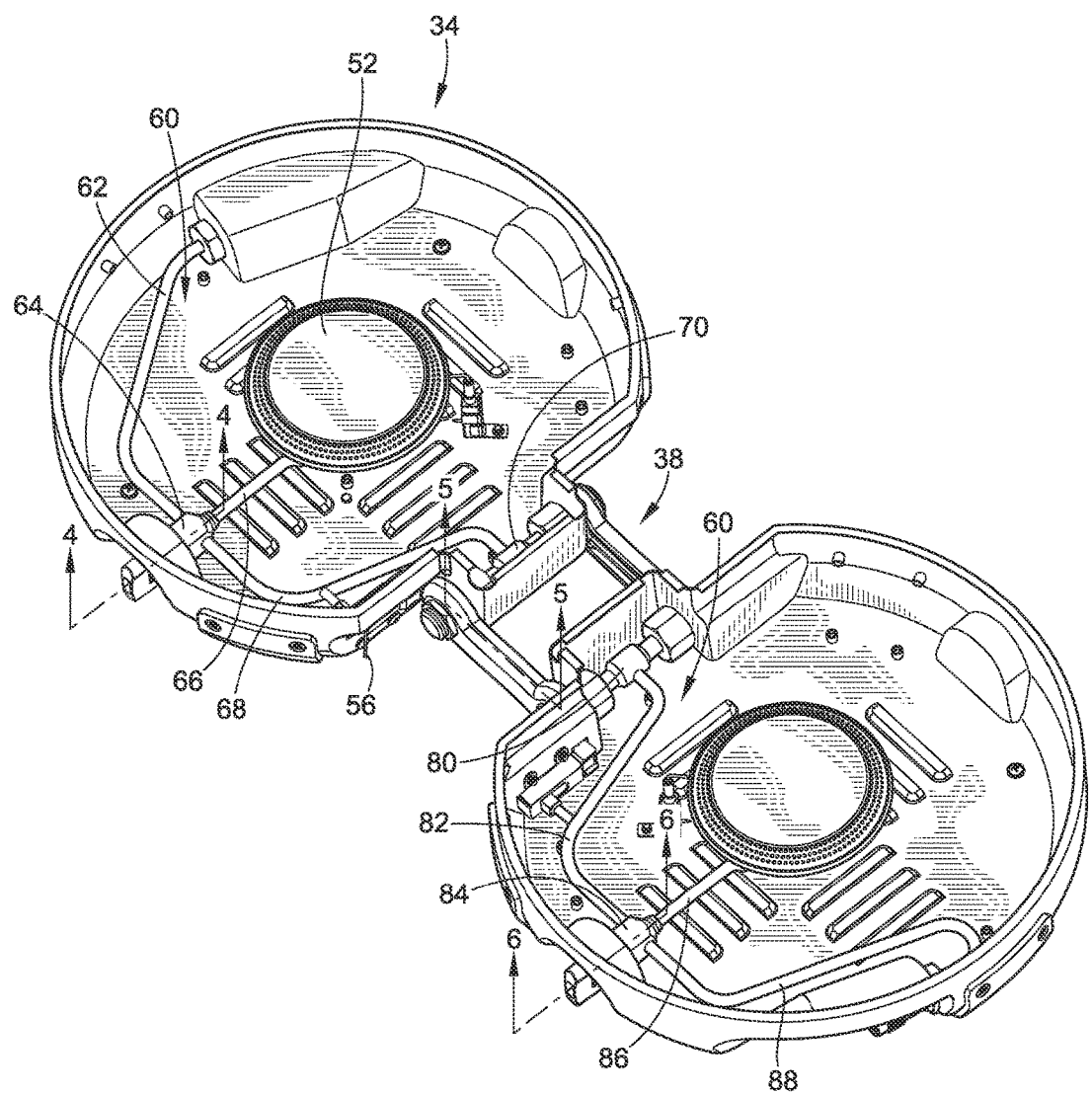
FIG. 3 is a perspective view of the embodiment of FIG. 1 with portions removed for purposes of illustration.

Turning now to FIG. 3, the drip trays and grate assemblies have been removed from first and second burner assemblies 34, 36 to expose the interior componentry thereof With reference to first burner assembly 34, an input conduit 62 extends from gas input port 22. This input conduit 62 terminates at a burner valve 64. As will be discussed in greater detail below, burner valve 64 is operable to allow a portion of the regulated gas flow received at gas input port 22 to pass therethrough substantially unaffected by burner valve 64. It should be noted that "substantially unaffected" in this regard means that this portion of the regulated gas flow passing through burner valve 64 may incur some losses due to ordinary losses imposed by burner valve 64. However, manipulation of a user control knob 98 (See FIG. 4) of burner valve 64 will not operate to affect this portion of the regulated gas flow.

Figure 4:
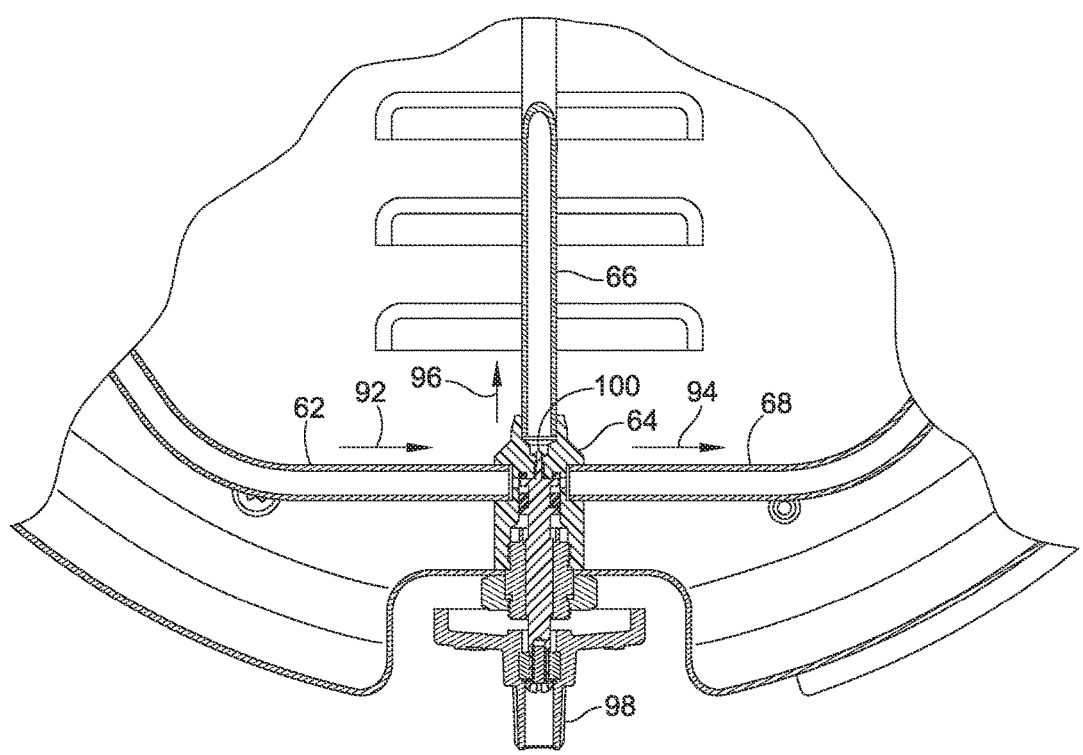
FIGS. 4-6 are a partial cross sections of the embodiment of FIG. 1.

Turning now to FIG. 4, gas flowing through input conduit 62 moves along direction 92 where it encounters burner valve 64. As stated above, a portion of this flow passes therethrough substantially unaffected by burner valve 64, and continues along direction 94 through output conduit 68. However, where, burner valve 64 is open, i.e. where valve member 100 is moved away from its valve seat by manipulation of knob 98, gas also flows along direction 96 where it is combusted at burner 52. As will be readily appreciated, a user can manipulate knob 98 to govern the flow to burner 52. Where burner valve 64 is entirely closed, the "portion" of the flow of gas which passes through burner valve 64 substantially unaffected thereby is the entirety of the flow.

Figure 5:
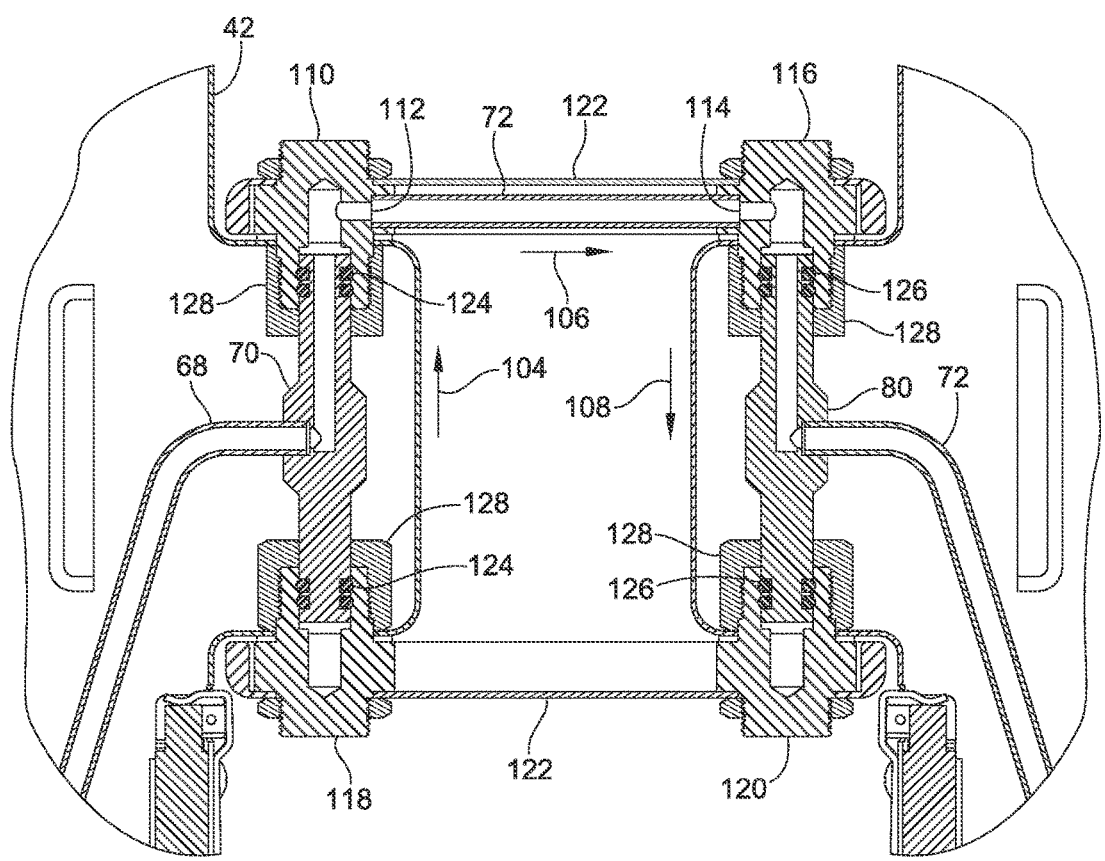

Turning now to FIG. 5, this regulated gas flow passes through output conduit to rotatable element 70 as shown in FIG. 5. Rotatable element 70 is connected to a hinge conduit 72 which in turn is connected to another rotatable element 80 of second burner assembly 36 such that the regulated gas flow effectively passes through hinge arrangement 38.

With continued reference to FIG. 5, rotatable element 70 is sealingly and rotatably connected to hinge flow elbow 110. Rotatable element 70 may rotate about its center longitudinal axis relative to hinge flow elbow 110. However, seals 124 are provided at an end of rotatable element 70 to prevent gas leakage at the interface of rotatable element 70 and hinge flow elbow 110. The same holds true for hinge block 118 which is positioned at the opposite end of rotatable element 70 than that of hinge flow elbow 110.

Gas passing through rotatable element 70 and hinge flow elbow 110 passes through an output port 112 of hinge flow elbow 110 and then through hinge conduit 72. This flow is then received at an input port 114 of hinge flow elbow 116 which is positioned at an opposite end of hinge conduit 72 than that of hinge flow elbow 110. This regulated flow of gas then passes through hinge flow elbow 116 into rotatable element 80.

As was the case with rotatable element 70, rotatable element 80 is capable of rotation about its longitudinal axis relative to hinge flow elbow 116 and hinge block 120. Seals 126 are positioned at opposed ends of rotatable element 80 to prevent gas leakage in the interface of rotatable element 80 and hinge flow elbow 116 as well as rotatable element 80 and hinge block 120.

As can also be seen in this view, hinge bars 122 extend between hinge blocks 118, 120 as well as hinge flow elbows 110, 116. The hinge block 122 extending between hinge flow elbows 110, 116 also shrouds hinge conduit 72. Threaded caps 128 are positioned at each hinge flow elbow 110, 116 as well as hinge blocks 118, 120 to fasten the same to their respective burner assembly. As can be surmised from the foregoing, the regulated flow of gas passes through rotatable element 70 along direction 104, and then through hinge conduit 72 in direction 106, and then through rotatable element 80 in direction 108 where that passes to input conduit 82 of second burner assembly 36 as described below.

Figure 6:
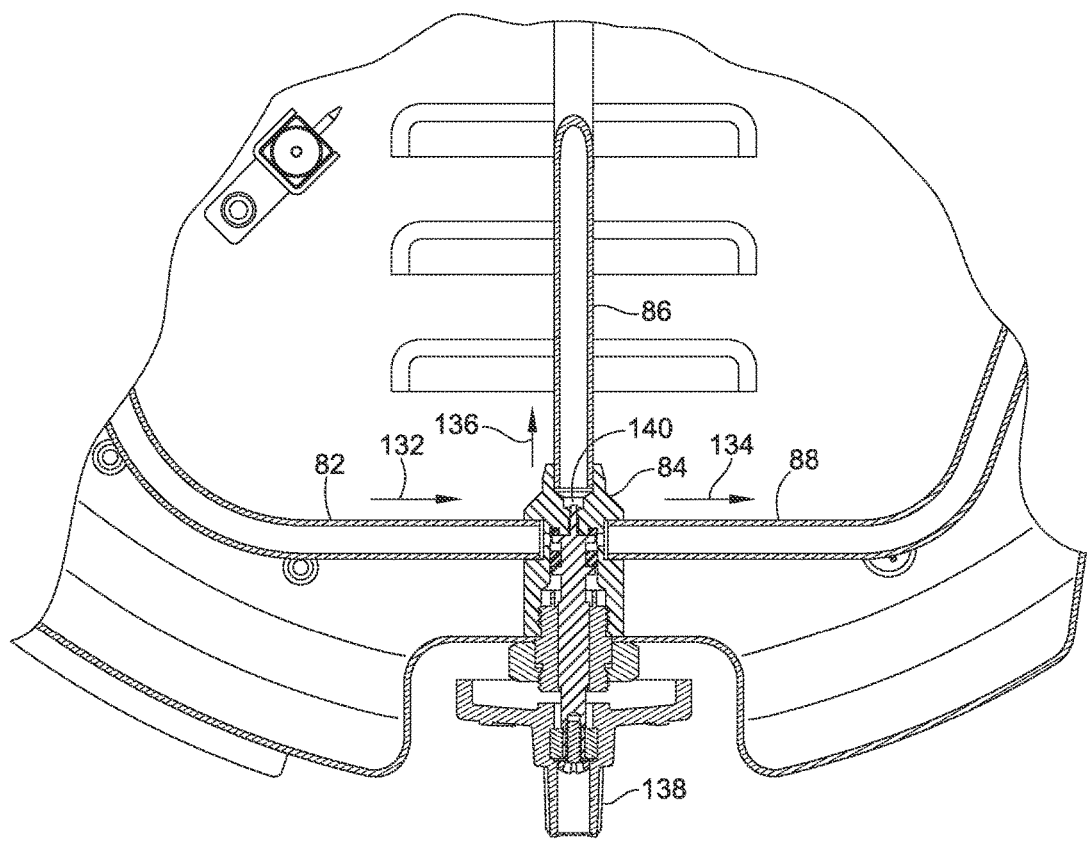

Turning now to FIG. 6, the same illustrates the interior plumbing of second burner assembly 36. The regulated gas flow passing through input conduit 82 flows in direction 132. This flow then encounters a burner valve 84 which is the same as burner valve 64 discussed above. A portion of this regulated gas flow passes through burner valve 84 and continues through output conduit 88 in direction 134 as shown. This portion of the regulated gas flow is substantially unaffected by burner valve 84. This portion of the regulated gas flow flowing through output conduit 88 is then made available at gas output port 24 (See FIG. 1). Gas output port 24 employs a gas port connection which will only allow a flow of gas when an appropriate connection is made to another component. In other words, when there is no connection made at gas output port 24, gas output port 24 prevents gas from flowing out of the same.

However, another portion of this regulated gas flow is controllable by manipulation of control knob 138 as it passes through burner conduit 86 in direction 136 to the burner of burner assembly 36. This is achieved by manipulation of the position of a valve member 140 of control valve 84.

Figure 7:
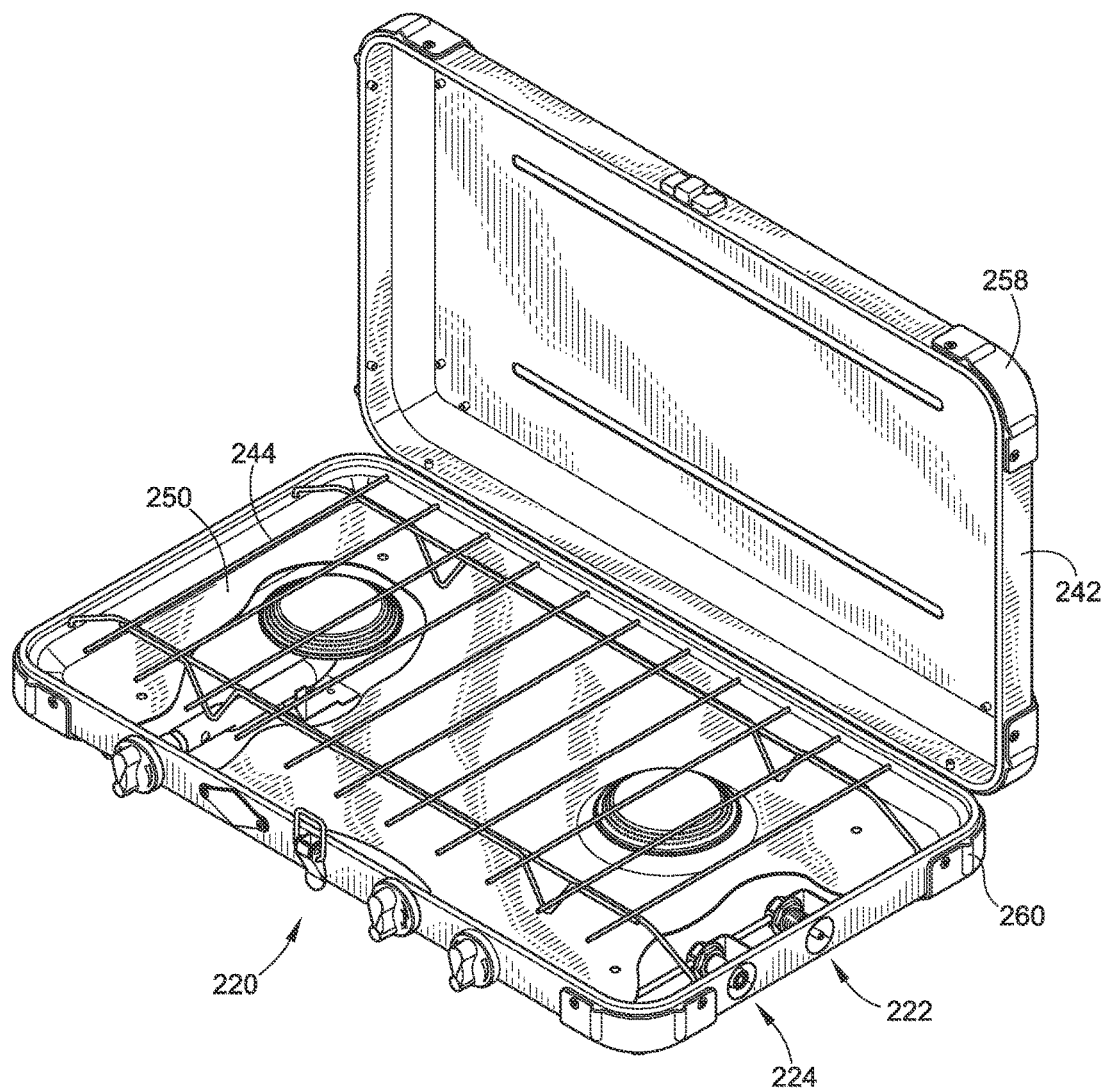
FIG. 7 is a perspective view of a second embodiment of a portable stove according to the teachings of the present invention.
Figure 8:
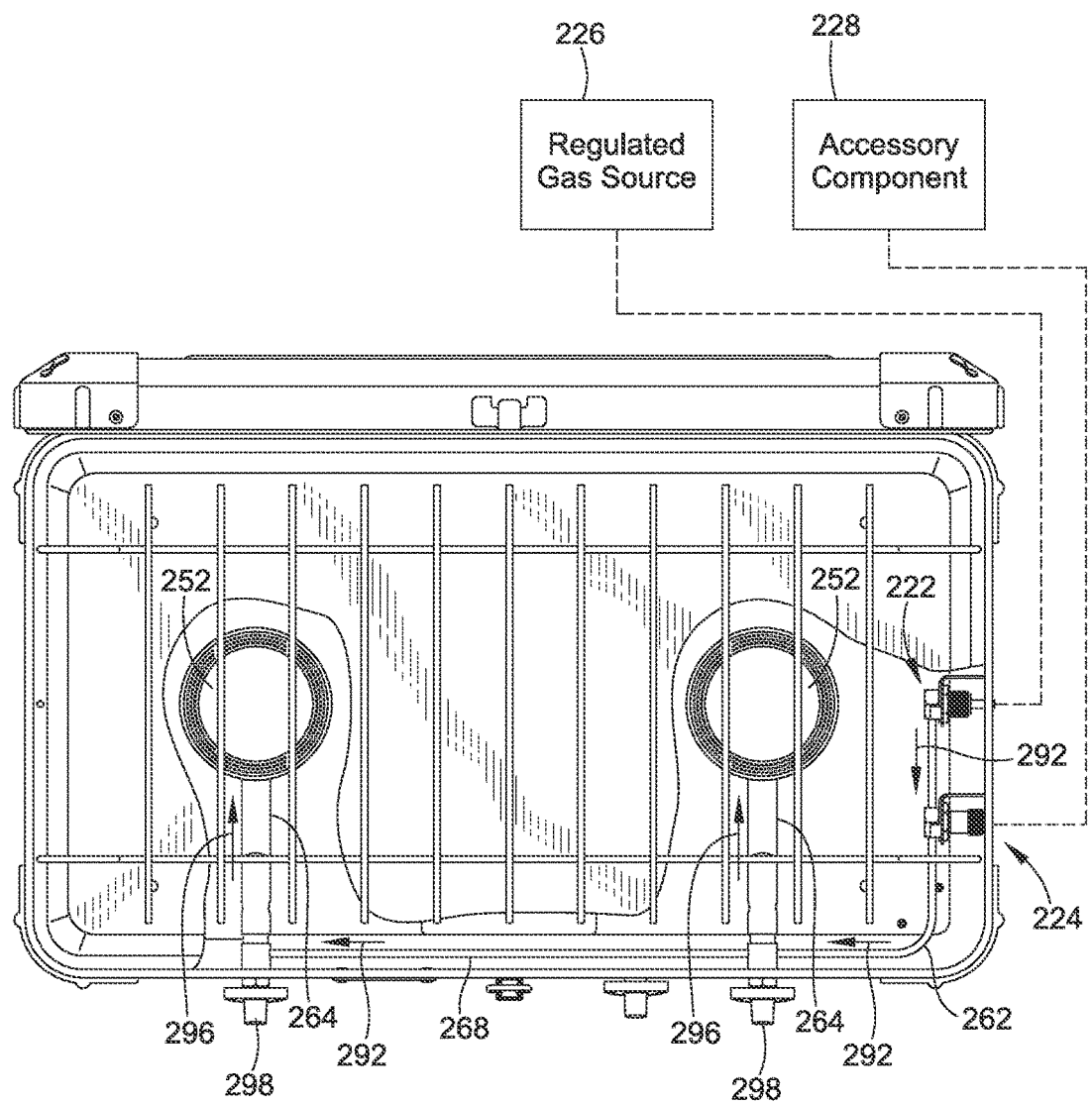
FIG. 8 is a top view of the embodiment of FIG. 7 with portions removed for purposes of illustration.

Turning now to FIGS. 7 and 8, an alternative embodiment of a stove 220 is illustrated. This embodiment of stove 220 provides the same advantages and functionality of the stove 20 described above, but has a generally different shape. Indeed, stove 220 has a generally rectangular shape defined by a foldable outer shell 242. A pair of burners 252 are positioned above a drip tray 250 and below a grate assembly 244. These components are carried within a bottom half 260 of outer shell 242. A top half 258 of outer shell 242 operates as a foldable lid for stove 220.

A gas input port 222 is accessible along a sidewall of stove 220. A gas output port is also accessible from the same sidewall. Turning now to FIG. 8, a regulated flow of gas is provided from regulated gas source 226 to gas input port 222 by way of their connection.

This regulated flow of gas then flows along input conduit 262 in direction 292 as shown. Prior to encountering burner valves 264 associated with each burner 252, this regulated flow of gas is made available at gas output port 224. An accessory component 228 as described above may be connected to gas output port 224 and received this regulated flow of gas.

A portion of this regulated flow of gas also passes through control valve 264 in direction 292 substantially unaffected by control valve 264. This portion then flows to control valve 264 associated with the left-most burner 252 illustrated in FIG. 8. Each burner valve 264 is connected to control knobs 298 such gas flowing in direction 296 through each burner 252 is controlled by manipulation of these control knobs 298.

It will be recognized that in this embodiment, the gas output port 224 is immediately adjacent gas input port 222, unlike the embodiment described relative to FIGS. 1-6 above, wherein the control valves 64 are interposed between gas input port 22 and gas output port 24.

As will be recognized from the foregoing, embodiments of the portable stove with accessory port described herein advantageously provides a system in which multiple portable gas powered components may be operably connected to one another and powered by a single regulated gas source. This advantageously allows for a reduction in the number of components that a user must bring when hiking, camping, etc.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A portable stove, comprising:
   an outer housing;
   at least one burner contained within the outer housing;
   an input port for connection to a fuel source such that the input port receives a regulated flow of fuel from the fuel source, the input port operably connected to the at least one burner to provide the regulated flow of fuel to the burner; and an accessory port operably connected to the input port downstream from the input port such that the regulated flow of fuel is available at the accessory port for use by a separate accessory connected to the portable stove via the accessory port.

2. The portable stove of claim 1, further comprising a control valve connected between the input port and the burner, the control valve operable to control a flow rate of the regulated flow to the burner.

3. The portable stove of claim 2, wherein the one control valve is interposed between the input port and the accessory port relative to the regulated flow.

4. The portable stove of claim 3, wherein the control valve is configured to allow a portion of the regulated flow to pass through the control valve and flow to the accessory port.

5. The portable stove of claim 3, wherein the at least one burner includes two burners, each having a control valve connected thereto, wherein each of the control valves are interposed between the input port and the accessory port, and wherein each of the two control valves is configured to allow a portion of the regulated flow to pass therethrough and flow to the accessory port.

6. The portable stove of claim 2, wherein the control valve is connected downstream of both the input port and the accessory port relative to the regulated flow.

7. The portable stove of claim 6, wherein the at least one burner includes two burners each having a control valve connected thereto, wherein the control valves are connected downstream of both the input port and the accessory port.

8. The portable stove of claim 1, wherein the outer housing has a rectangular profile, and wherein each of the input port and accessory port are accessible on a sidewall of the outer housing.

9. The portable stove of claim 8, wherein the input and accessory ports are adjacent one another on the sidewall of the outer housing and face in a same direction.

10. The portable stove of claim 1, wherein the outer housing has a circular periphery, and wherein the input and accessory ports are disposed within the circular periphery within pockets of the outer housing.

11. The portable stove of claim 10, wherein the input port and accessory port face in opposite directions.

12. A portable stove, comprising:
an outer housing;
at least one burner contained within the outer housing;
an input port for connection to a fuel source such that the input port receives a regulated flow of fuel from the fuel source;
an accessory port for providing the regulated flow to an accessory component, the accessory port configured and arranged such that the accessory component may be directly connected to accessory port and function independently from the portable stove using the regulated flow;
a control valve for controlling a flow rate of the regulated flow to the at least one burner; and
wherein the input port, accessory port, and the control valve are serially connected to one another.

13. The portable stove of claim 12 wherein the control valve is interposed between the input port and the accessory port relative to the regulated flow.

14. The portable stove of claim 13, wherein the control valve is configured to allow a portion of the regulated flow to pass through the control valve and flow to the accessory port.

15. The portable stove of claim 13, wherein the at least one burner includes two burners, each having a respective control valve connected thereto such that two control valves are provided, wherein the two control valves are interposed between the input port and the accessory port, and wherein each of the two control valves is configured to allow a portion of the regulated flow to pass therethrough and flow to the accessory port.

16. The portable stove of claim 12, wherein the control valve is connected downstream of both the input port and the accessory port relative to the regulated flow.

17. The portable stove of claim 16, wherein the at least one burner includes two burners, each having a control valve connected thereto, wherein the control valves are connected downstream of both the input port and the accessory port.

18. A method of making a portable stove, the method comprising:
providing an outer housing;
situating at least one burner within said housing;
connecting an input port to the at least one burner, the input port configured to receive a regulated flow of fuel from a fuel source;
connecting a control valve to the at least one burner and to the input port, the control valve configured to control a flow rate of the regulated flow to the burner; and
connecting an accessory port to the input port such that the regulated flow is available at the accessory port to an separate accessory connected to the accessory port.

19. The method of claim 18, wherein step of connecting the accessory port to the input port includes connecting the accessory port such that the control valve is interposed between the input port and the accessory port relative to the regulated flow.

20. The method of claim 18, wherein the step of connecting the accessory port to the input port includes connecting the accessory port such that the control valve is downstream from both the input port and the accessory port relative to the regulated flow.

* * * * *

UNITED STATES PATENT AND TRADEMARK OFFICE
CERTIFICATE OF CORRECTION

PATENT NO. : 10,174,950 B2
APPLICATION NO. : 14/730790
DATED : January 8, 2019
INVENTOR(S) : Michael E. Hebert, Jr. et al.

It is certified that error appears in the above-identified patent and that said Letters Patent is hereby corrected as shown below:

In the Claims

Column 6 Line 60 Delete Claims 1-20 and insert Claims 1-20 as listed below:

--1. A portable stove, comprising:
    an outer housing;
    at least one burner contained within the outer housing;
    an input port for connection to a fuel source such that the input port receives a regulated flow of fuel from the fuel source, the input port operably connected to the at least one burner to provide the regulated flow of fuel to the burner; and
    an output port operably connected to the input port downstream from the input port such that the regulated flow of fuel is available at the output port.

2. The portable stove of claim 1, further comprising a control valve connected between the input port and the burner, the control valve operable to control a flow rate of the regulated flow to the burner.

3. The portable stove of claim 2, wherein the one control valve is interposed between the input port and the output port relative to the regulated flow.

4. The portable stove of claim 3, wherein the control valve is configured to allow a portion of the regulated flow to pass through the control valve and flow to the output port.

5. The portable stove of claim 3, wherein the at least one burner includes two burners, each having a control valve connected thereto, wherein each of the control valves are interposed between the input port and the output port, and wherein each of the two control valves is configured to allow a portion of the regulated flow to pass therethrough and flow to the output port.

Signed and Sealed this
Second Day of July, 2019

Andrei Iancu
*Director of the United States Patent and Trademark Office*

6. The portable stove of claim 2, wherein the control valve is connected downstream of both the input port and the output port relative to the regulated flow.

7. The portable stove of claim 6, wherein the at least one burner includes two burners each having a control valve connected thereto, wherein the control valves are connected downstream of both the input port and the output port.

8. The portable stove of claim 1, wherein the outer housing has a rectangular profile, and wherein each of the input port and output port are accessible on a sidewall of the outer housing.

9. The portable stove of claim 8, wherein the input and output ports are adjacent one another on the sidewall of the outer housing and face in a same direction.

10. The portable stove of claim 1, wherein the outer housing has a circular periphery, and wherein the input and output ports are disposed within the circular periphery within pockets of the outer housing.

11. The portable stove of claim 10, wherein the input port and output port face in opposite directions.

12. A portable stove, comprising:
    an outer housing;
    at least one burner contained within the outer housing;
    an input port for connection to a fuel source such that the input port receives a regulated flow of fuel from the fuel source;
    an output port for providing the regulated flow to an accessory component;
    a control valve for controlling a flow rate of the regulated flow to the at least one burner; and
    wherein the input port, output port, and the control valve are serially connected to one another.

13. The portable stove of claim 12 wherein the control valve is interposed between the input port and the output port relative to the regulated flow.

14. The portable stove of claim 13, wherein the control valve is configured to allow a portion of the regulated flow to pass through the control valve and flow to the output port.

15. The portable stove of claim 13, wherein the at least one burner includes two burners, each having a respective control valve connected thereto such that two control valves are provided, wherein the two control valves are interposed between the input port and the output port, and wherein each of the two control valves is configured to allow a portion of the regulated flow to pass therethrough and flow to the output port.

16. The portable stove of claim 12, wherein the control valve is connected downstream of both the input port and the output port relative to the regulated flow.

17. The portable stove of claim 16, wherein the at least one burner includes two burners, each having a control valve connected thereto, wherein the control valves are connected downstream of both the input port and the output port.

18. A method of making a portable stove, the method comprising:
    providing an outer housing;
    situating at least one burner within said housing;
    connecting an input port to the at least one burner, the input port configured to receive a regulated flow of fuel from a fuel source;
    connecting a control valve to the at least one burner and to the input port, the control valve configured to control a flow rate of the regulated flow to the burner; and
    connecting an output port to the input port such that the regulated flow is available at the output port.

19. The method of claim 18, wherein step of connecting the output port to the input port includes connecting the output port such that the control valve is interposed between the input port and the output port relative to the regulated flow.

20. The method of claim 18, wherein the step of connecting the output port to the input port includes connecting the output port such that the control valve is downstream from both the input port and the output port relative to the regulated flow.--